Oct. 6, 1970   R. H. CHAPMAN   3,533,070
LINE CURRENT SENSING CIRCUIT
Filed Sept. 28, 1967
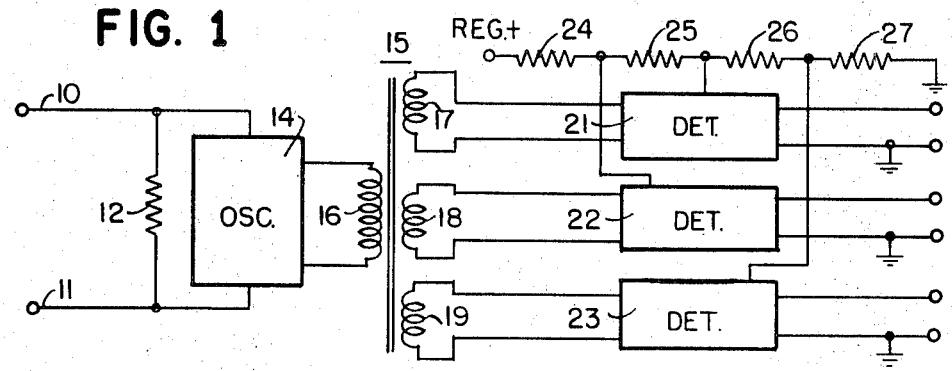
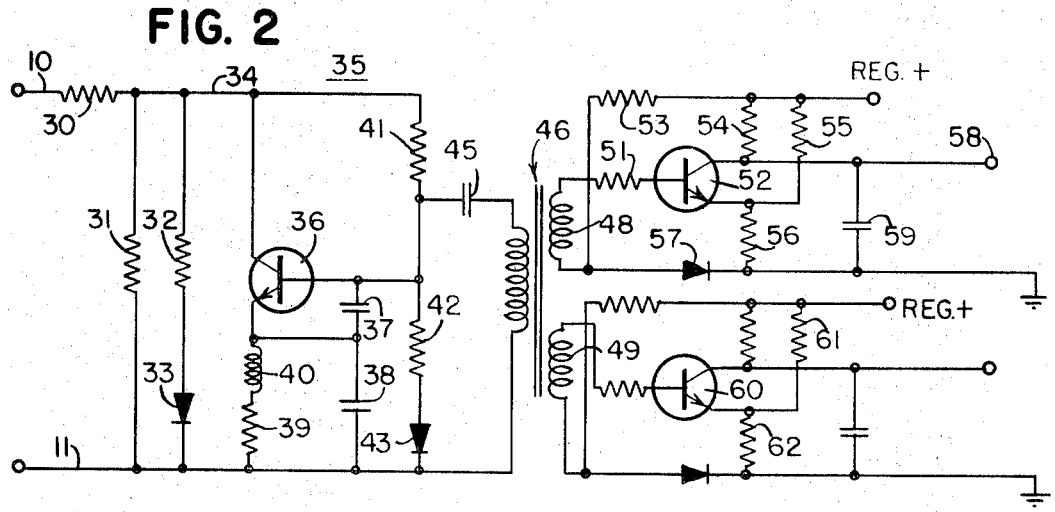
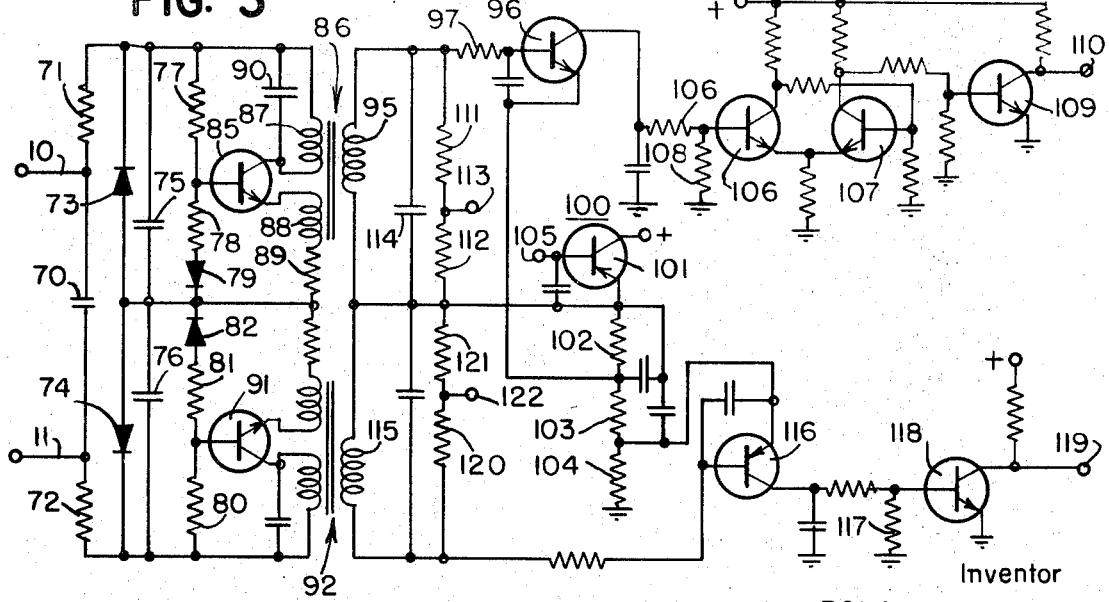
Inventor
RONALD H. CHAPMAN
BY
Mueller, Aichele & Rauner
ATTYS.

United States Patent Office 3,533,070
Patented Oct. 6, 1970

3,533,070
LINE CURRENT SENSING CIRCUIT
Ronald H. Chapman, Wheaton, Ill., assignor to Motorola, Inc., Franklin Park, Ill., a corporation of Illinois
Filed Sept. 28, 1967, Ser. No. 671,440
Int. Cl. H04q 9/00
U.S. Cl. 340—172                                                  8 Claims

ABSTRACT OF THE DISCLOSURE

System for responding to line currents of different values and directions of current flow to provide selective control operations at remote equipment. An oscillator is energized by the line current to provide an alternating current output having an amplitude proportional to the amplitude of the current, with different outputs being provided for current flow in opposite directions. A detector circuit which is conductively isolated from the line has a plurality of portions which respond to the amplitude of the alternating current output and produce individual controls for selective operation of equipment.

BACKGROUND OF THE INVENTION

It has been common practice to control remote equipment through a wire line by the application of currents to the line having different values and which flow in different directions. Relays have been used to respond to the current flow to provide different control operations depending upon the amount of current and the direction of flow of the current. For example, radio transmitters located at remote points have been so controlled, with the amount of the current controlling the turn on and off of the transmitter, the frequency of operation, the transmitter power and/or other characteristics.

These relay systems are objectionable because the mechanical moving parts wear and are subject to faulty operation. Electronic switching circuits have been used but present a problem in that the control system should be conductively isolated from the line. Systems have been used wherein an alternating current is gated in accordance with the amplitude and polarity of the line current but these have not been suitable for certain applications.

SUMMARY OF THE INVENTION

It is an object of the invention to provide a solid state line current sensing circuit for remote control operation wherein false operation cannot take place in the absence of line current.

Another object of the invention is to provide a line current sensing circuit wherein the control is provided by alternating current resulting directly from the line current, and the detecting circuit for the alternating current is conductively isolated from the line.

In accordance with the invention, an oscillator including semiconductor devices is energized from the line current and is arranged so that the amplitude of the oscillation varies with the amount of line current, and that separate oscillator sections are provided with separate outputs for line currents of opposite polarities. The oscillator can be of any known type wherein the amplitude of oscillation varies with the energizing voltage, which in turn varies with the line current. The oscillations are applied to a detector system which actuates different controls depending upon the amplitude of the oscillations. The detector system includes a plurality of sections, one or more for responding to oscillations resulting from line current flowing in one direction, and/or one or more for responding to oscillations produced by line current flowing in the opposite direction. The detector system responds to oscillations of different amplitudes by providing different threshold voltages for the different detectors and/or by controlling the part of the oscillations applied to the detectors.

BRIEF DESCRIPTION OF THE DRAWINGS

FIG. 1 is a block diagram illustrating the system of the invention;
FIG. 2 is a circuit diagram illustrating one embodiment of the invention; and
FIG. 3 is a circuit diagram illustrating a second embodiment of the invention.

DETAILED DESCRIPTION

In FIG. 1 there is illustrated the line current sensing circuit of the invention in block diagram form. The line current is applied through conductors 10 and 11 which may be wire lines extending from a central station to remote equipment to be controlled. Resistor 12 is connected across the line so that the voltage developed thereacross varies with the line current. The line current may have values in the range from 2 to 10 milliamperes, for example, and the voltage developed across resistor 12 will vary in proportion to the line current. The voltage developed across resistor 12 is applied to oscillator 14 to energize the same. The oscillator 14 will therefore operate when sufficient voltage is developed across resistor 12 to energize the same, and the amplitude of oscillations produced by the oscillator 14 will vary with the energizing voltage applied thereto. Oscillators of various types are suitable for this operation and specific circuits are illustrated in FIGS. 2 and 3.

The alternating current signal produced by the oscillator 14 is applied to transformer 15 which includes primary winding 16 and secondary windings 17, 18 and 19. The windings 17, 18 and 19 may have equal numbers of turns so that equal alternating current voltages are developed thereacross. It may be desired to have different numbers of turns in the three secondary windings so that the voltages developed thereacross differ, as will be explained. Detectors 21, 22 and 23 are coupled respectively to the secondary windings 17, 18 and 19. These detectors produce an output when an alternating current signal having a predetermined amplitude or larger is applied thereto.

The amplitude of the signal to which each detector responds can be determined by a bias voltage applied thereto by the voltage divider including resistors 24, 25, 26 and 27. Voltage is applied across these resistors in series from a regulated supply, and the resistors are arranged to provide less than the full supply voltage to the detectors 21, 22 and 23. In the event that the secondary windings 17, 18 and 19 apply the same alternating current signal to the three detectors, the detector 23 to which the smallest bias is applied will respond when the lowest level of alternating current input is exceeded, the detector 21 to which a larger bias is applied will respond when a higher level of alternating current signal is exceeded, and the detector 22 to which the largest bias voltage is applied will respond only to an alternating current signal having a larger amplitude. A logic circuit can be connected to the outputs of the detectors to provide the required controls when outputs are provided by the various detectors.

As previously stated, the windings 17, 18 and 19 may have different numbers of turns to apply alternating current signals of different amplitude to the detectors. In such case, all of the detectors can be biased at the same value, and the detectors will respond to different levels of the alternating current signal as produced by the oscillator. The outputs from the detectors can be used to control various equipments such as to turn on and off a radio transmitter, to control the frequency of the radio transmitter or to provide any other desired action.

In FIG. 2 there is illustrated a complete circuit diagram of a line sensing circuit in accordance with the invention. As preveiously stated, the lines 10 and 11 connect the circuit with a controlling station which applies currents of different amplitudes through the lines 10 and 11. The line current is applied through resistor 30 to resistor 31 and to the series combination of resistor 32 and diode 33, which are connected in parallel across resistor 31. The values of resistors 31 and 32 control the voltage developed between conductors 34 and 11 in response to various levels of line currents on conductors 10 and 11. The diode 33 increases the voltage on line 34 for low values of line current to insure that the oscillator will start.

The oscillator 35 includes transistor 36 which is of the Colpitts type, with capacitors 37 and 38 forming a voltage divider. The junction between the capacitors 37 and 38 is connected to the emitter electrode of the transistor, which is connected through resistor 39 and choke 40 to the line 11. Resistors 41 and 42 and diode 43 provide bias to the base electrode, with the diode 43 providing temperature compensation and also compensating for the base-to-emitter drop of the transistor 36 so that the transistor will start at low voltage. The output of the oscillator is developed in transformer 46 having a primary winding connected through capacitor 45 to the base of transistor 36.

The transformer 46 has secondary windings 48 and 49 which are individually connected to separate detector circuits which include transistors 52 and 60. Secondary winding 48 is connected through resistor 51 to the base electrode of transistor 52. Bias is applied to the base electrode from the circuit including resistor 53 and diode 57, with the voltage across diode 57 being applied to the base electrode through the secondary winding 48 and resistor 51. The collector electrode is connected to the postive potential through resistor 54, and resistors 55 and 56 form a voltage divider to apply a predetermined bias voltage to the emitter electrode of transistor 52. Diode 57 provides temperature compensation for the transistor 52. When the peak level of the alternating current signal applied from the secondary winding 48 to the base of transistor 52 reaches a value which exceeds the reverse bias applied to the emitter electrode, transistor 52 will conduct on a pulse basis so that the potential at the collector will drop to provide a control voltage at output terminal 58. The output is filtered by capacitor 59.

The detector circut connected to secondary winding 49 can be the same as the detector circuit connected to the winding 48. The signal is applied to the base of transistor 60, and the emitter of this transistor is biased by the voltage divider including resistors 61 and 62. The secondary windings 48 and 49 may be identical to apply alternating current signals of the same level to the transistors 52 and 60. In such case the voltage divider including resistors 61 and 62 will be selected to provide a different reverse bias to the emitter of transistor 60 than the reverse bias applied to transistor 52. This will cause the transistor 60 to begin to conduct on a pulse basis at a different peak level of the applied alternating current signal.

In FIG. 3 there is shown a second embodiment of the invention. The system of FIG. 3 is arranged to provide different controls in response to current flow in opposite directions in the lines 10 and 11. When the current flows in a direction so that the conductor 10 is positive, a path is completed through resistor 71, resistor 77, resistor 78, diode 79, diode 74 and resistor 72. Capacitor 75 acts to filter the voltage developed across resistors 77 and 78 and diode 79. This voltage forms the operating voltage for an oscillator including transistor 85. Feedback is provided for the oscillator by transformer 86 which has a primary winding 87 connected to the collector electrode of transistor 85 and a feedback winding 88 connected to the emitter electrode. Resistor 89 connects the feedback winding 88 to the reference point, and capacitor 90 tunes the primary winding 87.

When the current flows through conductors 10 and 11 in the direction such that conductor 10 is positive with respect to conductor 11, the voltage developed across resistors 77 and 78 and diode 79 energizes the oscillator and the amplitude of oscillations varies with such voltage. This voltage in turn varies with the amplitude of the current through the line. When the current is supplied in the opposite direction so that line 11 is positive with respect to line 10, the conducting path includes resistor 72, resistor 80, resistor 81, diode 82, diode 73 and resistor 71. The voltages developed across resistors 80 and 81 and diode 82 energize the oscillator including transistor 91 and transformer 92. Again, the amplitude of oscillations will vary with the voltage developed, which in turn depends upon the amplitude of current applied through the line.

The oscillations in transformer 86 are coupled from the secondary winding 95 thereof to the detector circuit including transistor 96. The alternating current signal is applied through resistor 97 to the base electrode of transistor 96 and a bias voltage is applied to the emitter electrode from the regulator circuit 100. When the alternating current peak signal exceeds the bias voltage, the transistor 96 will conduct.

The regulator circuit 100 includes transistor 101 having its collector electrode connected to the positive supply, and a reference voltage applied from terminal 105 to its base electrode. A voltage divider is connected to the emitter electrode including resistors 102, 103 and 104. Taps are provided on the voltage divider so that bias voltages can be derived therefrom to provide conduction of the detectors when the applied peak alternating current signal reaches a desired value.

The collector electrode of transistor 96 is connected to the trigger circuit including transistors 106 and 107, and when the transistor conducts a voltage is developed across resistor 108 to render transistor 106 conducting and turn off transistor 107. The trigger circuit is in turn coupled to output transistor 109, and the turn off of transistor 107 renders transistor 109 conducting. The detector output is derived at terminal 110 connected to the collector of transistor 109.

Connected across the secondary winding 95 are resistors 111 and 112 which form a voltage divider to provide a portion of the oscillator signal at terminal 113. Capacitor 114 is used to tune the secondary of transformer 86. A further detector such as the detector including transistor 96 can be coupled to terminal 113 and will receive therefrom a portion of the alternating current signal. The detector can be biased in the same way as transistor 96, and will then respond only when an alternating current of a larger amplitude is produced by the oscillator including transistor 85. The bias can be selected to provide a response at any desired signal level corresponding to a current level in lines 10 and 11.

The secondary winding 115 of the transformer 92 is likewise coupled to a detector which includes transistor 116. The emitter electrode of this transistor is biased at a different point by the regulator circuit 100. The transistor 116 conducts when the alternating current signal applied exceeds the bias so that a voltage is developed across resistor 117 connected to the collector of transistor 116. The voltage is applied to the base of output transistor 118 to render the same conductive. The detector output is derived at terminal 119 connected to the collector of transistor 118.

Resistors 120 and 121 are connected across secondary winding 115 to provide an output at terminal 122, which will be a portion of the alternating current signal developed in the secondary winding 115. This can similarly be applied to a detector and if the same bias voltage is used as is applied to transistor 116, this detector will respond only to a larger alternating current signal since the peak amplitude of the signal applied thereto is reduced.

It will be apparent that various detector circuit arrangements can be used to provide responses to different levels of the signal and to respond to signals of opposite polarities. The specific circuits shown in FIG. 2 and 3 are representative of such circuits.

The system of the invention has been found to be effective to sense currents of different values and polarities in a line, with the detectors being conductively isolated from the line. The system is made up entirely of solid state components and includes no relays or other components having moving parts. Failure of the transfer circuit cannot cause a false operation since the oscillations which are detected are directly produced from the line current.

What is claimed is:

1. In a remote control system wherein equipment at a remote station is controlled from a central station by the application of direct currents of different values on a line extending from the central station to the remote station, apparatus at the remote station for sensing current on the line and producing different responses to direct currents of different levels including in combination, means for connection to the line for producing a voltage from the direct current on the line which varies with the amplitude of the current on the line, oscillator means coupled to said voltage producing means and energized thereby, said voltage producing means being the sole means for energizing said oscillator means, said oscillator means producing oscillations having an amplitude related to the value of the applied voltage, and detector means coupled to said oscillator means including a plurality of detector portions, each of said detector portions responding to oscillations of a predetermined amplitude to provide a control operation.

2. The system of claim 1 including biasing means for said detector portions for applying voltages thereto for controlling the response thereof so that said detector portions respond to oscillations of different amplitudes.

3. The system of claim 1 wherein said oscillator means includes a semiconductor oscillator.

4. The system of claim 1 including transformer means for coupling said detector means to said oscillator means for isolating said detector means from the line.

5. The system of claim 4 wherein said transformer means includes a plurality of secondary windings individually connected to said detector portions and applying signals from said oscillator means to said detector portions at different levels.

6. The system of claim 1 wherein said means for producing a voltage includes first means for producing a voltage in response to current flowing through the line in one direction and second means for producing a voltage in response to current flowing through the line in the opposite direction.

7. The system of claim 6 wherein said oscillator means includes a first portion connected to said first means and energized by the voltage produced thereby, and a second portion connected to said second means and energized by the voltage produced thereby.

8. The system of claim 7 wherein said detector means includes first and second portions connected respectively to said first and second portions of said oscillator means.

References Cited

UNITED STATES PATENTS 3,287,715    11/1966    Riches et al. ____ 340—209 XR
3,400,219    9/1968    Jahns et al. _____ 340—172 XR DONALD J. YUSKO, Primary Examiner U.S. Cl. X.R.

328—115